US012683828B2

(12) United States Patent
Viele

(10) Patent No.: US 12,683,828 B2
(45) Date of Patent: Jul. 14, 2026

(54) APPARATUS AND METHOD FOR ENGINE CONTROL

(71) Applicant: Vieletech Inc., Woodland Park, CO (US)

(72) Inventor: Matthew Viele, Florissant, CO (US)

(73) Assignee: VIELETECH INC., Woodland Park, CO (US)

( * ) Notice: Subject to any disclaimer, the term of this patent is extended or adjusted under 35 U.S.C. 154(b) by 0 days.

(21) Appl. No.: 18/811,386

(22) Filed: Aug. 21, 2024

(65) Prior Publication Data

US 2024/0410493 A1 Dec. 12, 2024

Related U.S. Application Data

(62) Division of application No. 17/686,271, filed on Mar. 3, 2022, now Pat. No. 12,098,780.

(Continued)

(51) Int. Cl.
*H04L 12/40* (2006.01)
*F02D 41/00* (2006.01)
(Continued)

(52) U.S. Cl.
CPC ............ *H04L 12/40* (2013.01); *F02D 41/009* (2013.01); *F02D 41/2432* (2013.01);
(Continued)

(58) Field of Classification Search
CPC .... F02D 41/009; F02D 41/2432; F02D 41/28; F02D 2041/281; F04B 27/005;
(Continued)

(56) References Cited

U.S. PATENT DOCUMENTS

| | | | |
|---|---|---|---|
| 6,736,614 B1 | 5/2004 | Bahnen et al. | |
| 7,258,085 B2 * | 8/2007 | Niiyama | F02B 63/04 |
| | | | 123/46 R |

(Continued)

FOREIGN PATENT DOCUMENTS

| | | |
|---|---|---|
| CN | 107313920 A | 11/2017 |
| DE | 102005061477 A1 | 7/2007 |

(Continued)

OTHER PUBLICATIONS

FlexRay , "How FlexRay Works", https://web.archive.org/web/20150223081221/http://cache.freescale.com:SO/files/abstract/overview_applications/FRWORKS.html (2015).

(Continued)

*Primary Examiner* — Mark L. Greene
(74) *Attorney, Agent, or Firm* — Viksnins Harris Padys Malen LLP

(57) ABSTRACT

An apparatus and method for sensing the position of a piston in a valve in a gas compressor or the position of a piston in a free piston engine. The apparatus includes a plurality of valve sensors, a plurality of magnets, and a plurality of valve sense modules coupled to the valve sensors and a controller coupled to the plurality of valve sense modules. The method includes processing information received from the valve sensors to determine the linear position of the valves in the gas compressor or a piston in a free piston engine.

12 Claims, 11 Drawing Sheets

Related U.S. Application Data

(60) Provisional application No. 63/156,313, filed on Mar. 3, 2021, provisional application No. 63/156,315, filed on Mar. 3, 2021, provisional application No. 63/156,316, filed on Mar. 3, 2021.

(51) Int. Cl.

| | |
|---|---|
| *F02D 41/24* | (2006.01) |
| *F02D 41/28* | (2006.01) |
| *F04B 27/00* | (2006.01) |
| *F04B 39/10* | (2006.01) |
| *F04B 49/22* | (2006.01) |
| *F04B 53/10* | (2006.01) |
| *F04B 53/14* | (2006.01) |
| *F04B 53/16* | (2006.01) |
| *F16K 37/00* | (2006.01) |

(52) U.S. Cl.
CPC ............ *F02D 41/28* (2013.01); *F04B 27/005* (2013.01); *F04B 39/102* (2013.01); *F04B 49/22* (2013.01); *F04B 53/10* (2013.01); *F04B 53/14* (2013.01); *F04B 53/16* (2013.01); *F16K 37/0033* (2013.01); *F02D 2041/281* (2013.01); *G05B 2219/15072* (2013.01); *H04L 2012/40208* (2013.01)

(58) Field of Classification Search
CPC ........ F04B 39/102; F04B 49/22; F04B 53/10; F04B 53/14; F04B 53/16; F16K 37/0033; F16K 37/0041; G05B 2219/15072; H04L 12/40; H04L 2012/40208
See application file for complete search history.

(56) References Cited

U.S. PATENT DOCUMENTS

| | | | |
|---|---|---|---|
| 7,740,501 | B2 | 6/2010 | Ballard et al. |
| 8,978,595 | B2 * | 3/2015 | Klopzig ................ F16C 32/048 123/2 |
| 9,657,675 | B1 * | 5/2017 | Roelle ................. F02D 41/1402 |
| 10,474,169 | B2 | 11/2019 | Grödl et al. |
| 12,098,780 | B2 | 9/2024 | Viele |
| 2022/0157165 | A1 | 5/2022 | Dantrey et al. |
| 2022/0236116 | A1 | 7/2022 | Zhao et al. |
| 2022/0365210 | A1 | 11/2022 | Lind |
| 2022/0397109 | A1 | 12/2022 | Martignago et al. |

FOREIGN PATENT DOCUMENTS

| | | | |
|---|---|---|---|
| JP | H05172504 | A | 7/1993 |
| JP | H10148275 | A | 6/1998 |
| JP | 3805291 | B2 | 8/2006 |
| JP | 2009180596 | A | 8/2009 |
| JP | 2012042259 | A | 3/2012 |
| KR | 20170068107 | A | 6/2017 |
| NL | 2024256 | B1 | 7/2021 |

OTHER PUBLICATIONS

Honeywell , "Hall-Effect Sensors Vs. Anisotropic Magnetoresistance (AMR) Sensors", https://sps.honeywell.com/us/en/support/blog/siot/hall-effect-sensors-vs-anisotropic-magnetoresistance-amr-sensors#:-: text=Hall-effect (2019).

* cited by examiner

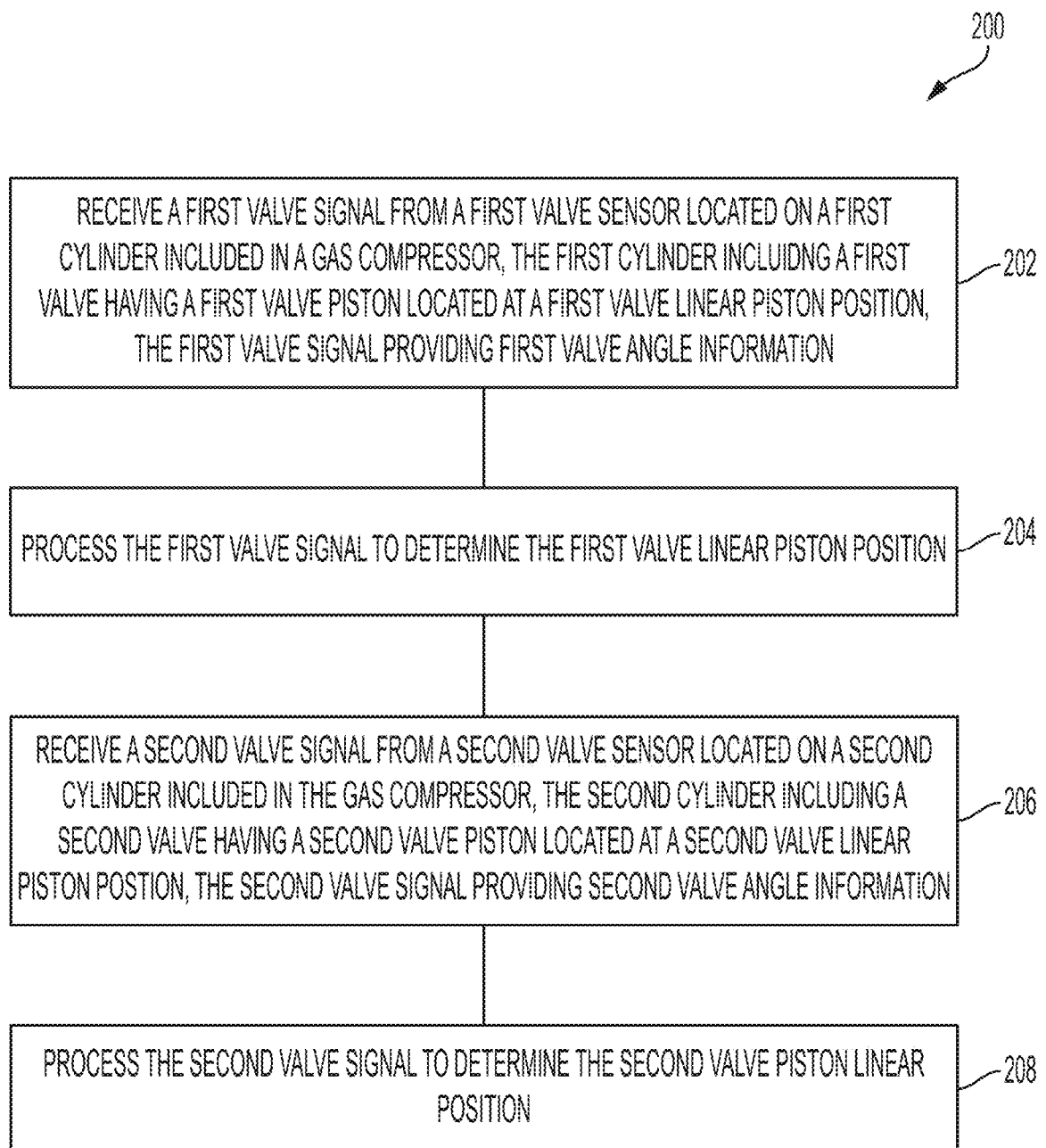

200

RECEIVE A FIRST VALVE SIGNAL FROM A FIRST VALVE SENSOR LOCATED ON A FIRST CYLINDER INCLUDED IN A GAS COMPRESSOR, THE FIRST CYLINDER INCLUIDNG A FIRST VALVE HAVING A FIRST VALVE PISTON LOCATED AT A FIRST VALVE LINEAR PISTON POSITION, THE FIRST VALVE SIGNAL PROVIDING FIRST VALVE ANGLE INFORMATION — 202

PROCESS THE FIRST VALVE SIGNAL TO DETERMINE THE FIRST VALVE LINEAR PISTON POSITION — 204

RECEIVE A SECOND VALVE SIGNAL FROM A SECOND VALVE SENSOR LOCATED ON A SECOND CYLINDER INCLUDED IN THE GAS COMPRESSOR, THE SECOND CYLINDER INCLUDING A SECOND VALVE HAVING A SECOND VALVE PISTON LOCATED AT A SECOND VALVE LINEAR PISTON POSTION, THE SECOND VALVE SIGNAL PROVIDING SECOND VALVE ANGLE INFORMATION — 206

PROCESS THE SECOND VALVE SIGNAL TO DETERMINE THE SECOND VALVE PISTON LINEAR POSITION — 208

FIG. 2

GENERATE A SENSOR SIGNAL FROM EACH OF A PLURALITY OF SENSORS INCLUDED IN A PISTON RAIL OF A FREE PISTON ENGINE THAT INCLUDES A PLURALITY OF MAGNETS LOCATED ON THE PISTON, THE PISTON HAVING A LINEAR PISTON POSITION — 502

RECEIVE THE SENSOR SIGNAL FROM EACH OF THE PLURALITY OF SENSORS — 504

PROCESS EACH OF THE SENSOR SIGNALS TO DETERMINE THE LINEAR PISTON POSITION — 506

Figure 6:
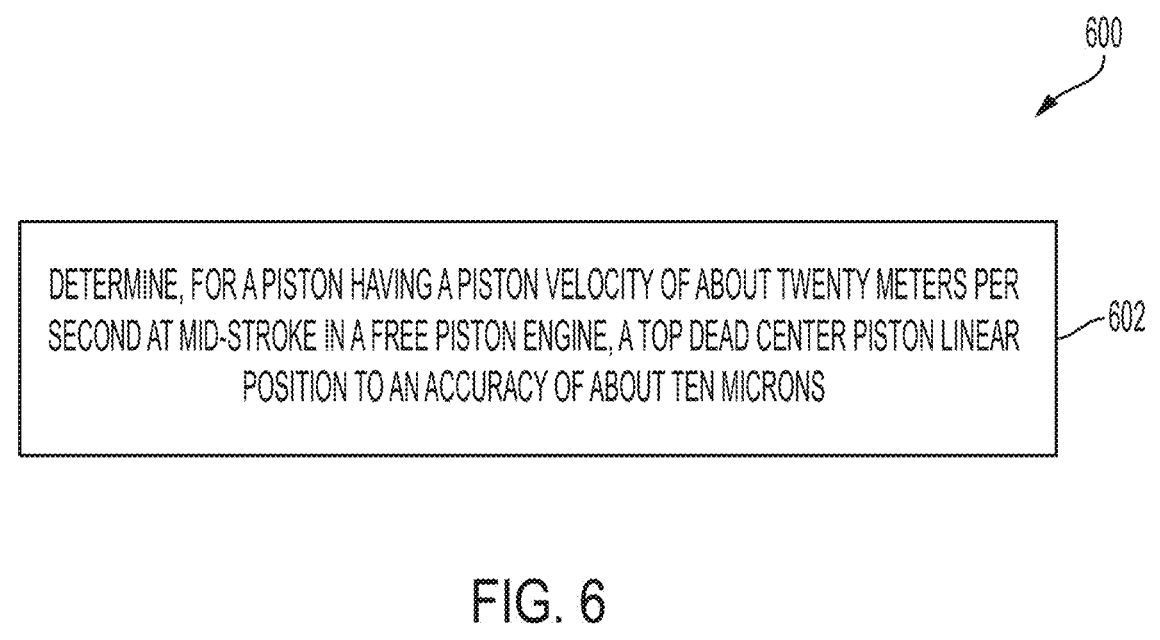

600

DETERMINE, FOR A PISTON HAVING A PISTON VELOCITY OF ABOUT TWENTY METERS PER SECOND AT MID-STROKE IN A FREE PISTON ENGINE, A TOP DEAD CENTER PISTON LINEAR POSITION TO AN ACCURACY OF ABOUT TEN MICRONS

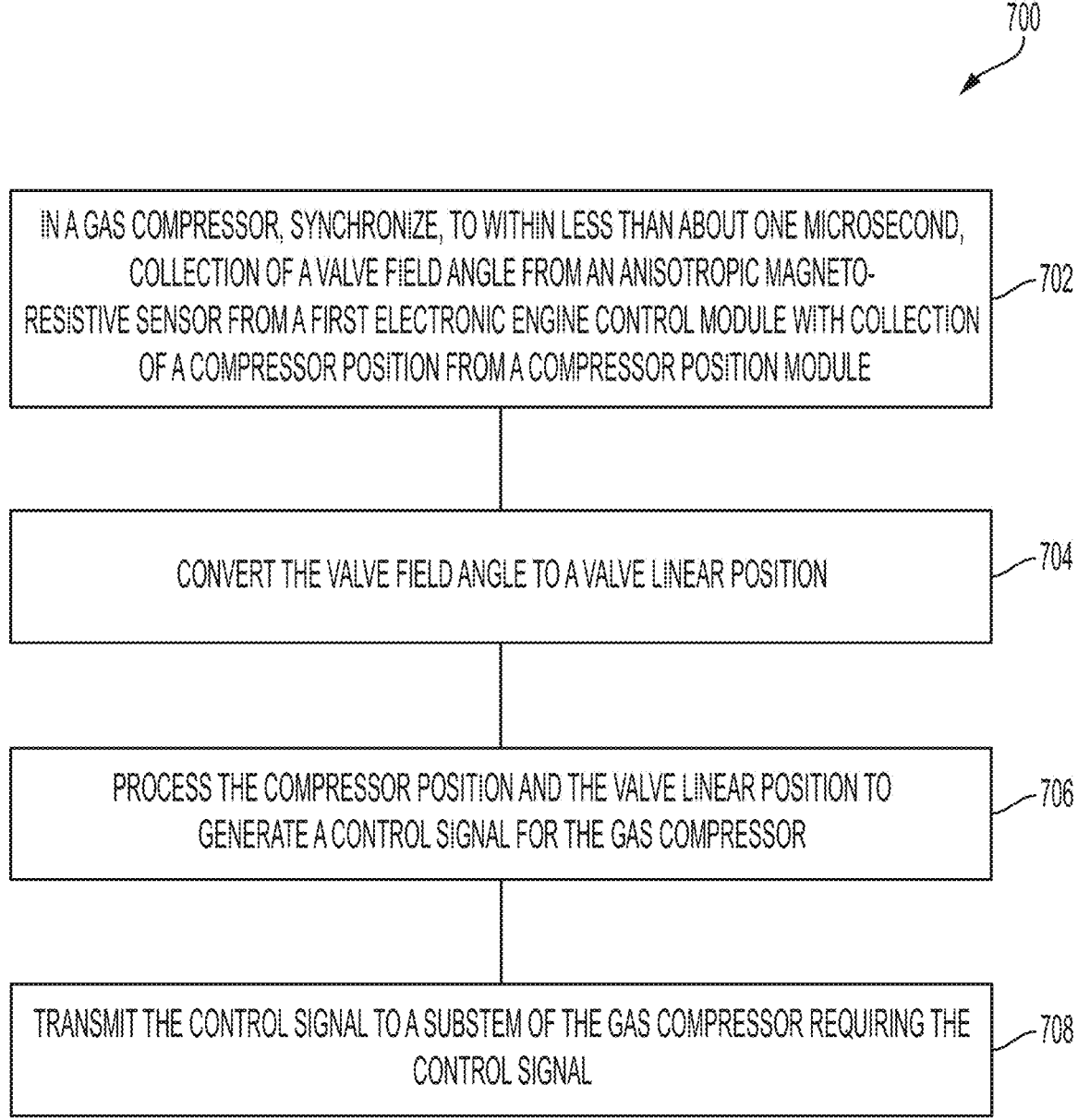

700

IN A GAS COMPRESSOR, SYNCHRONIZE, TO WITHIN LESS THAN ABOUT ONE MICROSECOND, COLLECTION OF A VALVE FIELD ANGLE FROM AN ANISOTROPIC MAGNETO-RESISTIVE SENSOR FROM A FIRST ELECTRONIC ENGINE CONTROL MODULE WITH COLLECTION OF A COMPRESSOR POSITION FROM A COMPRESSOR POSITION MODULE — 702

CONVERT THE VALVE FIELD ANGLE TO A VALVE LINEAR POSITION — 704

PROCESS THE COMPRESSOR POSITION AND THE VALVE LINEAR POSITION TO GENERATE A CONTROL SIGNAL FOR THE GAS COMPRESSOR — 706

TRANSMIT THE CONTROL SIGNAL TO A SUBSTEM OF THE GAS COMPRESSOR REQUIRING THE CONTROL SIGNAL — 708

FIG. 7

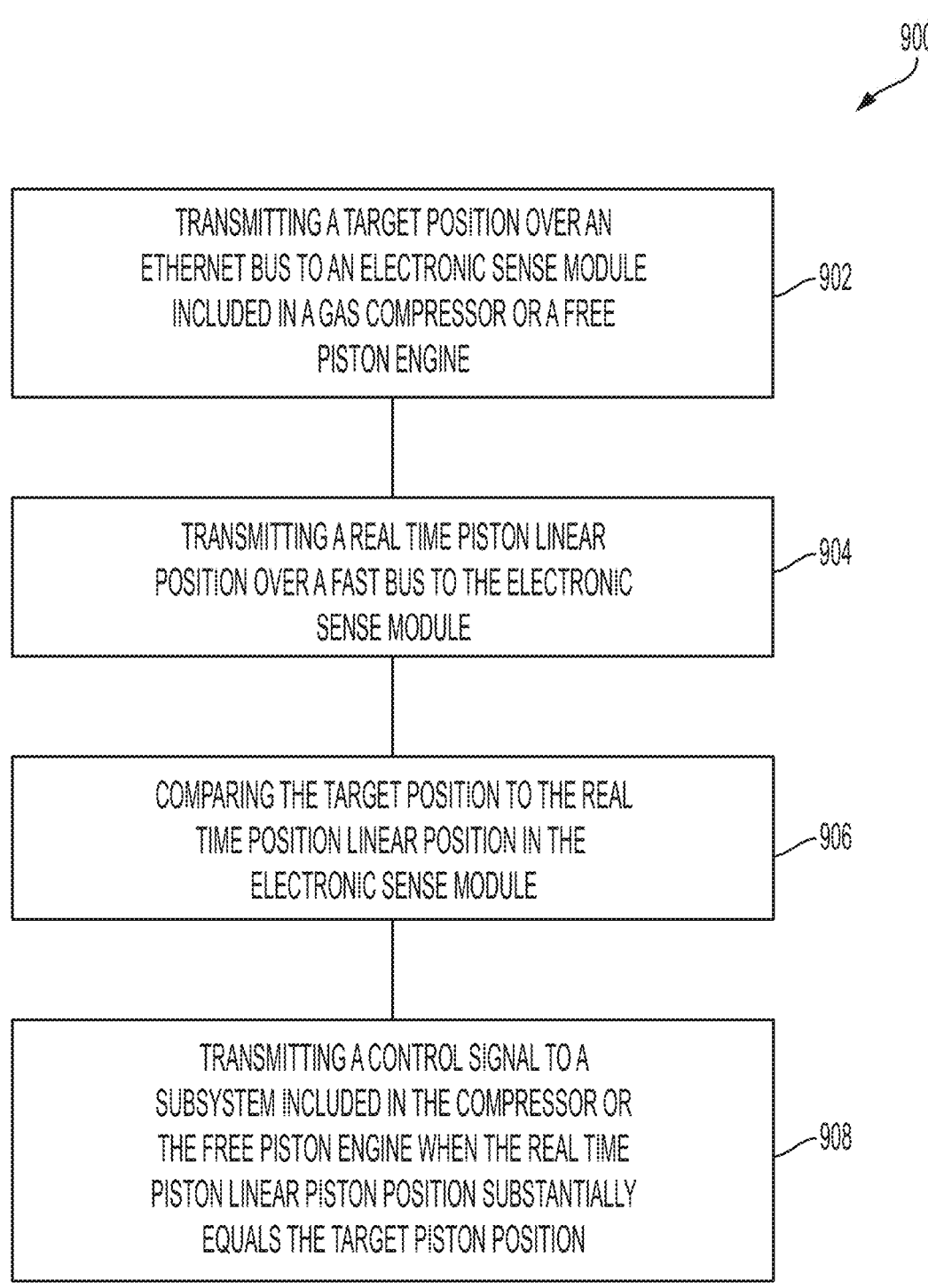

900

TRANSMITTING A TARGET POSITION OVER AN
ETHERNET BUS TO AN ELECTRONIC SENSE MODULE
INCLUDED IN A GAS COMPRESSOR OR A FREE
PISTON ENGINE — 902

TRANSMITTING A REAL TIME PISTON LINEAR
POSITION OVER A FAST BUS TO THE ELECTRONIC
SENSE MODULE — 904

COMPARING THE TARGET POSITION TO THE REAL
TIME POSITION LINEAR POSITION IN THE
ELECTRONIC SENSE MODULE — 906

TRANSMITTING A CONTROL SIGNAL TO A
SUBSYSTEM INCLUDED IN THE COMPRESSOR OR
THE FREE PISTON ENGINE WHEN THE REAL TIME
PISTON LINEAR PISTON POSITION SUBSTANTIALLY
EQUALS THE TARGET PISTON POSITION — 908

FIG. 9

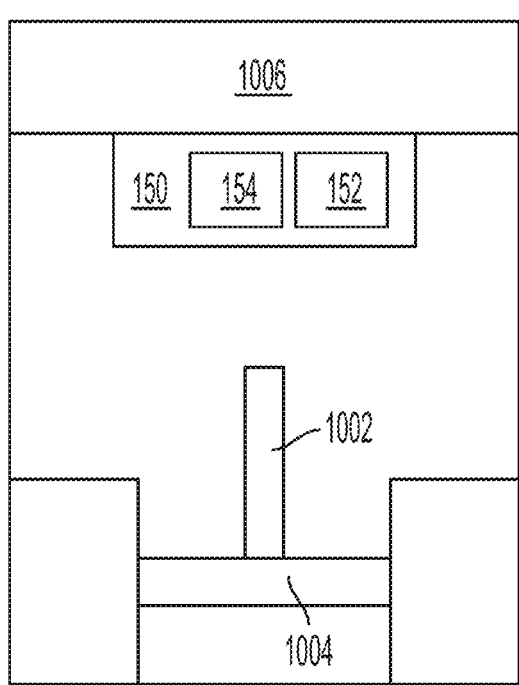
FIG. 10

APPARATUS AND METHOD FOR ENGINE CONTROL

CROSS-REFERENCE TO RELATED APPLICATIONS

This application is a divisional of U.S. patent application Ser. No. 17/686,271, filed 3 Mar. 2022 and claims priority to U.S. Provisional Patent Application No. 63/156,313, filed 3 Mar. 2021, to U.S. Provisional Patent Application No. 63/156,315, filed 3 Mar. 2021, and to U.S. Provisional Patent Application No. 63/156,316, filed 3 Mar. 2021. The entire content of the applications referenced above are hereby incorporated by reference herein.

FIELD

The present disclosure relates to control systems. In particular, the disclosure relates to a control system for use in gas compressors, crankshaft engines, and free piston engines.

BACKGROUND

Current control systems are inflexible and not modular, so a new system has to be designed for each engine configuration. Current control systems are also unable to meet the engine control system requirements for precision measurements and data transmission rates in gas compressors, crankshaft engines, and free piston engines. For example, the control of a gas compressor requires collecting data in the presence of electronic noise without waiting for a second sampling cycle when noise corrupts the data collected in a first cycle. Current gas compressor control systems are unable to meet this requirement. In a second example, free piston engines require ten micron measurement accuracy of a piston's linear position at top dead center for a piston having a velocity of about twenty meters per second at mid-stroke in a free piston engine. Current free piston engine control systems are unable to meet this requirement. For these and other reasons there is need for the subject matter of the present disclosure.

SUMMARY

Consistent with disclosed embodiments, an apparatus for use in a gas compressor is disclosed. The apparatus includes a first cylinder in a gas compressor. The first cylinder includes a first cylinder plurality of valves and a first cylinder plurality of valve sensors. Each of the first cylinder plurality of valve sensors is associated with one of the first cylinder plurality of valves. Each of the first cylinder plurality of valves includes a first cylinder valve moving part having a first cylinder valve magnet coupled to the first cylinder valve moving part. The first cylinder electronic sense module is coupled to each of the first cylinder plurality of valve sensors. A second cylinder in the gas compressor includes a second cylinder plurality of valves and a second cylinder plurality of valve sensors. Each of the second cylinder plurality of valve sensors is associated with one of the second cylinder plurality of valves. Each of the second cylinder plurality of valves includes a second cylinder valve moving part with a second cylinder valve magnet coupled to the second cylinder valve moving part. A second cylinder electronic sense module is coupled to each of the second cylinder plurality of valve sensors and the first cylinder electronic sense module. A controller is coupled to the first cylinder electronic sense module.

In some embodiments, the first cylinder valve moving part comprises a first cylinder valve shaft coupled to a first cylinder valve piston. In some embodiments, at least one of the first cylinder plurality of valve sensors comprises an anisotropic magneto-resistive sensor. In some embodiments, the anisotropic magneto-resistive sensor is mounted on the gas cylinder at a location to enable sensing a full stroke of the first cylinder valve magnet. In some embodiments, the apparatus further comprises a substrate, a magnet embedded in the substrate, and an anisotropic magneto-resistive sensor embedded in the substrate. The substrate is mounted on the gas compressor and a connecting rod or valve component in the gas compressor is magnetically coupled to the magnet. The magnet provides a magnetic field having a field angle at the anisotropic magneto-resistive sensor. The connecting rod or valve component has an operating distance from the anisotropic magneto-resistive sensor. The anisotropic magneto-resistive sensor detects changes in the field angle. In some embodiments, the magnet comprises a ring magnet.

Consistent with disclosed embodiments, a method for use in a gas compressor is disclosed. The method comprises receiving a first valve signal from a first valve sensor located on a first cylinder included in a gas compressor. The first cylinder includes a first valve having a first valve piston located at a first valve linear piston position. The first valve signal provides first valve field angle information. The first valve signal is processed to determine the first valve linear piston position. A second valve signal is received from a second valve sensor located on a second cylinder included in the gas compressor. The second cylinder includes a second valve having a second valve piston located at a second valve linear piston position. The second valve signal provides second valve field angle information. The second valve signal is processed to determine the second valve piston linear position. In some embodiments, the first valve signal is received from the first valve sensor located on the first cylinder comprises receiving the first valve signal from an anisotropic magneto-resistive sensor having an anisotropic magneto-resistive sensor location on the cylinder. The first valve piston is coupled to a shaft and a magnet located at a magnet location on the shaft. The angle information relates the anisotropic magneto-resistive sensor location to the magnet location. In some embodiments, processing the first valve signal to determine the first valve linear piston comprises accessing a lookup table to match the first valve field angle information to the first valve piston linear position. In some embodiments, the method further comprises calibrating a magnetic circuit, in the gas compressor having a connecting rod or valve component, when replacing the connecting rod or valve component in the gas compressor. The method includes detecting a change in position of the connecting rod or valve component by identifying a change in a magnetic field included in the magnetic circuit. In some embodiments, the method further comprises for a gas being compressed by the gas compressor, the gas has a gas type, and the gas type is identified. A sampling rate is selected for the first valve sensor and the second valve sensor based on the gas type.

Consistent with disclosed embodiments, a method for use in a gas compressor is disclosed. The method comprises synchronizing, to within less than about one microsecond, collection of a valve field angle from an anisotropic magneto-resistive sensor from a first electronic engine control module with collection of compressor position from a compressor position module. Converting the valve field angle to a valve linear position. Processing the compressor position information and the valve linear position to generate a control signal for the gas compressor. Transmitting the control signal to a subsystem of the gas compressor requiring the control signal.

Consistent with disclosed embodiments, an apparatus for use in a free piston engine is disclosed. The apparatus comprises a piston included in a free piston engine. The piston includes a plurality of magnets. A piston rail in the free piston engine receives the piston. The piston rail includes a plurality of anisotropic magneto-resistive sensors. In some embodiments, at least one of the plurality of magnets comprises a ring magnet located at an end of the piston. In some embodiments, the apparatus further comprises an electronic sense module. Each of the plurality of anisotropic magneto-resistive sensors is coupled to the electronic sense module. A controller is coupled to the electronic sense module.

Consistent with disclosed embodiments, a method for use in a free piston engine is disclosed. The method comprises generating a sensor signal from each of a plurality of sensors included in a piston rail of a free piston engine. The piston engine includes a plurality of magnets located on a piston. The piston having a linear piston position. The sensor signal is received from each of the plurality of sensors. Each of the sensor signals is processed to determine the linear piston position. In some embodiments, the method further comprises rotating the piston during operation of the free piston engine.

Consistent with disclosed embodiments, a method for use in a free piston engine is disclosed. The method comprises determining, for a piston having a piston velocity of about twenty meters per second at mid-stroke in a free piston engine, a top dead center piston linear position to an accuracy of about ten microns. In some embodiments, determining, for the piston having the piston velocity of about twenty meters per second at mid-stroke in the free piston engine, the top dead center piston linear position to an accuracy of about ten microns comprises generating a sensor signal, when the piston position is top dead center, from an anisotropic magneto-resistive sensor included in a piston rail of a free piston engine that includes a magnet located on the piston. Processing the sensor signal to determine the top dead center linear piston position.

Consistent with disclosed embodiments, a method for use in a gas compressor, a crankshaft engine, and a free piston engine is disclosed. The method comprises transmitting a target piston position over an Ethernet bus to an electronic sense module included in a gas compressor or a free piston engine. The method further includes transmitting a real time piston linear position over a fast bus to the electronic sense module. The method further includes comparing the target piston position to the real time piston linear position in the electronic sense module. The method further includes transmitting a control signal to a subsystem included in the compressor or the free piston engine when the real time piston linear position substantially equals the target piston position. In some embodiments, the method further comprises transmitting configuration information for a fast bus over the Ethernet bus to each of a plurality of electronic sense modules capable of transmitting and receiving one or more fast bus messages, and calculating a latency for at least one of the one or more fast bus messages. In some embodiments, wherein transmitting the real time linear piston position over the fast bus to the electronic sense module comprises transmitting a packet including a dead byte and the real time linear position, and setting a bus connection for the first electronic sense module to a tristate level in response to receiving the dead byte. In some embodiments, wherein the packet including the dead byte provides control information for two pistons in the free piston engine. In some embodiments, wherein transmitting the real time piston linear position over the fast bus to the electronic sense module comprises transmitting the real time linear piston position to the electronic sense module at a rate of about once per microsecond.

Consistent with disclosed embodiments, an apparatus for use in a gas compressor, a crankshaft engine, and a free piston engine is disclosed. The apparatus comprises a substrate and a moving part. A magnet is embedded in the substrate. An anisotropic magneto-resistive sensor embedded in the substrate. The magnet provides a magnetic field having a field angle at the anisotropic magneto-resistive sensor. The substrate is mounted on a device including a position. The moving part of the piston magnetically couples to the magnet at one end of a stroke of the piston. In some embodiments, the piston has a stroke distance of between about one millimeter and about two millimeters.

It is to be understood that both the foregoing general description and the following detailed description are exemplary and explanatory only and are not restrictive of the invention, as claimed.

The accompanying drawings, which are incorporated in and constitute a part of this specification, illustrate embodiments of the invention and together with the description, serve to explain the principles of the invention.

BRIEF DESCRIPTION OF THE DRAWINGS

FIG. 2 shows a flow diagram of a method for determining the linear position of a valve in a gas compressor in accordance with some embodiments of the present disclosure;

FIG. 6 shows a flow diagram of a method for determining the top dead center position of a piston in a free piston engine in accordance with some embodiments of the present disclosure;

FIG. 7 shows a flow diagram of a method in a gas compressor for synchronizing information collection and transmitting control information to subsystems of the gas compressor in accordance with some embodiments of the present disclosure;

FIG. 9 shows a flow diagram of a method in a gas compressor or free piston engine for generating a control signal in accordance with some embodiments of the present disclosure; and FIG. 10 shows an illustration of an apparatus in accordance with some embodiments of the present disclosure.

DESCRIPTION

Reference will now be made in detail to the exemplary embodiments of the present disclosure described below and illustrated in the accompanying drawings. Wherever possible, the same reference numbers will be used throughout to refer to same or like parts.

While the present invention is described herein with reference to illustrative embodiments for particular applications, it should be understood that the invention is not limited thereto. Those having ordinary skill in the art and access to the teachings provided herein will recognize additional modifications, applications, embodiments, and substitution of equivalents, that all fall within the scope of the disclosure. Accordingly, the disclosure is not to be considered as limited by the foregoing or following descriptions.

Figure 1:
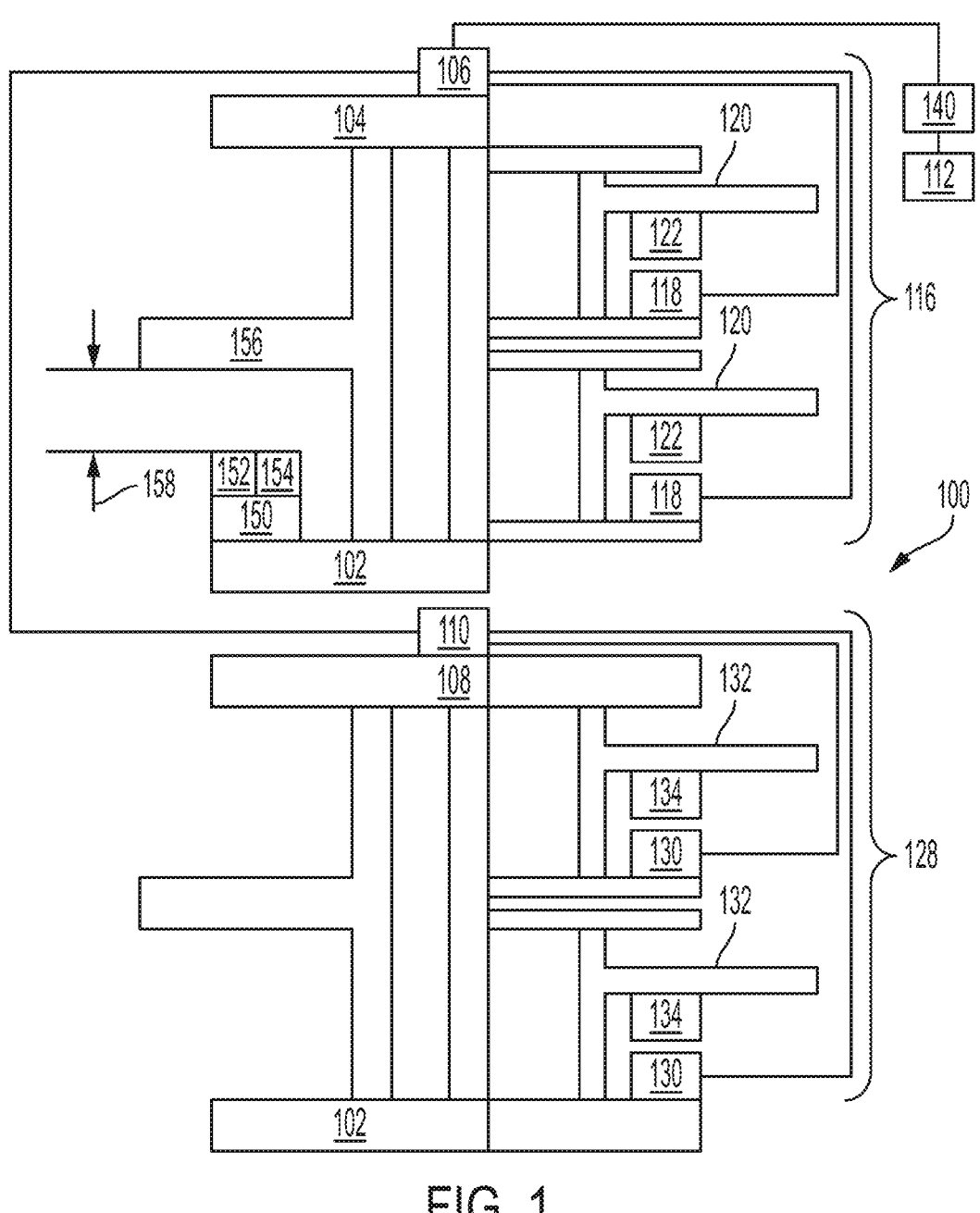
FIG. 1 shows a block diagram of an apparatus including a gas compressor in accordance with some embodiments of the present disclosure.

FIG. 1 shows a block diagram of an apparatus 100 including a gas compressor 102 in accordance with some embodiments of the present disclosure. The apparatus 100 is suitable for use in connection with many different types of gas compressors. Some examples of gas compressors suitable for use in connection with the apparatus 100 include gas compressors in the range of about eight hundred horsepower to about nine thousand horsepower that have four to ten cylinders and one to five valves per cylinder. The gas compressor 102 includes a first cylinder 104, a first cylinder electronic sense module 106, a second cylinder 108, a second cylinder electronic sense module 110, and a controller 112.

The first cylinder 104 includes a first cylinder plurality of valves 116 and a first cylinder plurality of valve sensors 118. Each of the first cylinder plurality of valve sensors 118 is associated with one of the first cylinder plurality of valves 116. In some embodiments, the first cylinder plurality of valve sensors 118 is mounted on the first cylinder 104. In some embodiments, at least one of the first cylinder plurality of valve sensors 118 includes an anisotropic magneto-resistive sensor. In some embodiments, the anisotropic magneto-resistive sensor is mounted on the gas cylinder at a location to enable sensing a full stroke of a first cylinder valve magnet 122. In some embodiments, the distance between each of the plurality of valve sensors 118 and the first cylinder valve magnet 122, for an anisotropic magneto-resistive sensor, is between about eight millimeters and twenty-eight millimeters. In some embodiments, the distance between the each of the plurality of valve sensors 118 and the first cylinder valve magnet 122, for an anisotropic magneto-resistive sensor, is between about fourteen millimeters and twenty-three millimeters. In some embodiments, the distance between the each of the plurality of valve sensors 118 and the first cylinder valve magnet 122, for an anisotropic magneto-resistive sensor, is about eighteen millimeters. In some embodiments, the distance between the each of the plurality of valve sensors 118 and the first cylinder valve magnet 122, for an anisotropic magneto-resistive sensor, is between about one millimeter and about two millimeters. In some embodiments, the distance between the each of the plurality of valve sensors 118 and the first cylinder valve magnet 122, for an anisotropic magneto-resistive sensor, is between about fifty percent and about one-hundred and fifty percent of the stroke distance.

In some embodiments, each of the plurality of the valve sensors 118 is an anisotropic magneto-resistive sensor. An anisotropic magneto-resistive sensor uses anisotropic magneto-resistive technology. Anisotropic magneto-resistive technology uses permalloy, an alloy of nickel and iron whose resistance changes proportionally in the presence of a magnetic field. In operation, the resistance in an anisotropic magneto-resistive sensor is converted to a voltage in the presence of a magnetic field. The voltage is directly proportional to the original current. Overlapping two sets of resistors at different angles provides information that enables the calculation of a magnetic field angle from two measurements. In some embodiments, the sensors are powered by a Power over Ethernet connection or an external power connection.

Anisotropic magneto-resistive sensors are intrinsically safe and therefore well suited for use in connection with a gas compressor. An intrinsically safe sensor cannot create a spark. Safety concerns in gas compressors dictate that sensors used in the presence of explosive gases, such as natural gas or hydrogen gas, which are gases commonly used in gas compressors, be intrinsically safe.

Being able to determine a linear valve position with anisotropic sensor in a complex engine or compressor control system was unexpected because Hall effect sensors have long been the standard sensors for use in engine and compressor control systems. The amount of information processing required to convert field angle information provided by an anisotropic magneto-resistive sensor signal to a piston linear position during a short time window was only a viable solution when combined with a fast bus (described below), an Ethernet bus, and daisy chaining of the electronic sense modules.

Each of the first cylinder plurality of valves 116 includes a first cylinder valve moving part 120 having a first cylinder valve magnet 122 coupled to the first cylinder valve moving part 120. In some embodiments, the first cylinder valve moving part 120 includes a first cylinder valve shaft coupled to a first cylinder valve piston. The first cylinder valve shaft is connected to a controllable pneumatic or hydraulic actuator (not shown).

The first cylinder electronic sense module 106 is coupled to each of the first cylinder plurality of valve sensors 118. The first cylinder electronic sense module 106 is fabricated to be mountable in close proximity to each of the first cylinder plurality of valve sensors 118. The distance between the first cylinder electronic sense module 106 and the first cylinder plurality of valve sensors 118 is less than about one meter. The first cylinder electronic sense module 106 is subject to the harsh environmental conditions of the gas compressor 102. The environmental conditions of the gas compressor 102 include explosive gases, high vibration, and an ambient temperature between about minus forty degrees Centigrade and eighty-five degrees Centigrade.

The electronic sense module 106 includes an Ethernet interface and supports an Ethernet timing protocol including the 802.1AS extension, which is sometimes referred to as Audio Visual Bridging or Time Synchronous Network. The electronic sense module 106 includes a three-port Ethernet switch. One port (upstream) talks to the controller 112 or the upstream module in a daisy chain series of modules. One port (downstream) talks to the next module in the daisy chain series away from the controller. And one port talks to the processor included in the electronic sense module 106. The electronic sense module 106 supports Power over Ethernet and "power over data link." Each upstream port functions as a Powered Device port and powers the electronic engine controller and powers the downstream port. The downstream port functions as Power Sourcing Equipment and powers the next downstream port.

The electronic sense module 106 supports auxiliary inputs for other signals from devices such as pressure sensors, contact switches, or vibration sensors. In some embodiments, vibration sensors are included in the electronic sense module. In some embodiments, a vibration sensor included in the gas compressor 102 provides data that is correlated to engine position. The vibration data can be transmitted to the controller 112 or the measured angle of the compressor can be transmitted to the electronic sense module 106 for data reduction. In some embodiments, the electronic sense module 106 supports valve actuation, which may be powered via Power over Internet or externally.

The electronic sense module 106 includes two external ports that support Power over Ethernet. This configuration allows a single cable to be run from the controller 112 to the first cylinder sense module 106 and the second cylinder sense module 110. In some embodiments, additional cylinder sense modules are added to the daisy chain of sense modules. The number of sense modules that can be daisy chained together is limited by the power consumption of the module and the power allowed by the particular gas that is being compressed by the gas compressor 102.

The electronic sense module 106 has an "in" ethernet port and an "out" ethernet port. While these are symmetric from a data point of view, the direction is material from a power point of view. Configuration of the modules is done using the link layer of ethernet where each device can know the information of the neighboring device. Thus, a user does not need to set the IP address.

The area occupied by a gas compressor can be an explosive environment. Power must be managed to maintain safety. The total power in the system is managed to keep the total power under the level proscribed by the gas. Power is managed by controlling the number of electronic sense modules in a daisy chain. Power is also managed by decreasing the sampling rate of each of the electronic sense modules.

The second cylinder 108 includes a second cylinder plurality of valves 128 and a second cylinder plurality of valve sensors 130. Each of the second cylinder plurality of valve sensors 130 is associated with one of the second cylinder plurality of valves 128. Each of the second cylinder plurality of valves 128 includes a second cylinder valve moving part 132 having a second cylinder valve magnet 134 coupled to the second cylinder valve moving part 132.

The second cylinder electronic sense module 110 is coupled to each of the second cylinder plurality of valve sensors 130 and the first cylinder electronic sense module 106.

In some embodiments, the controller 112 is coupled through an ethernet barrier connector 140 to the first cylinder electronic sense module 106. In some embodiments, the controller 112 is intrinsically safe, and the controller 112 is coupled directly to the first cylinder electronic sense module 106.

To maintain safety in the gas compressor 102, in some embodiments, an ethernet intrinsic barrier such as the Ethernet barrier connector 140 is located between the controller 112, when the controller is not intrinsically save, and each daisy chain of electronic sense modules, such as electronic sense module 106. The Ethernet barrier connector is intrinsically safe. In some embodiments, the ethernet barrier connector 104 is a vibration resistant industrial ethernet connector.

Each electronic sense module, including electronic sense modules 106, 110, 404, 804, and 806 described herein are not limited to the single function of sensing. The electronic sense modules can include a processor, a field-programmable gate array or application specific integrated circuit and other signal processing circuits and systems. In some embodiments, the electronic sense modules include the function of controlling an actuator in an engine or compressor.

Each valve that returns data to an electronic engine control module has a corresponding actuator that includes one or two solenoid valves. If the valves are driven, there is a low side switch, such as a metal-oxide semiconductor field effect transistor or similar device, connecting the valve to ground and a protected twenty-four volt supply that is current limited to an intrinsically safe level (a few hundred milliamperes depending on the type of gas being processed and the classification level). In some embodiments, the solenoid valves include a high-side (sometimes called sourcing) switch that is current limited to a safe level. In some embodiments, the controller 112 actuates the solenoid valves.

In some embodiments, the apparatus 100 further includes a substrate 150, a magnet 152 embedded in the substrate 150, and an anisotropic magneto-resistive sensor 154 embedded in the substrate 150. In some embodiments, the magnet 152 comprises a ring magnet. The substrate 150 is mounted on the gas compressor 102. The connecting rod or valve component 156 in the gas compressor 102 is magnetically coupled to the magnet 152. The connecting rod or valve component 156 has an operating distance 158 from the anisotropic magneto-resistive sensor 154. The magnet 152 provides a magnetic field having a field angle at the anisotropic magneto-resistive sensor 154. The field angle is a magnetic field angle presented at a anisotropic magneto-resistive sensor. In operation, the anisotropic magneto-resistive sensor 154 detects changes in the field angle. Changes in the operating distance 158 are reflected in the field angle.

The gas compressor 102 has a failure mode characterized by "rod drop." As bearings in the gas compressor 102 wear out, the connecting rod or valve component 156 starts to wobble or "drop." Changes in position of the connecting rod or valve component 156 can be measured by the anisotropic magneto-resistive sensor 154 embedded in the substrate 150 and mounted on the magnet 152. The magnetic field of the magnet 152 is set perpendicular to the sensor field. A metallic connecting rod or valve component completes a magnetic circuit. As the location of the connecting rod or valve component 156 changes position over time the change in position is detected by the anisotropic magneto-resistive sensor 154.

The angle is non-linear, so a non-linear process is used to convert the anisotropic magneto-resistive angle to a linear position of the probe. The controller can either merely note that the connecting rod or valve component 156 is out of position for an insignificant change in position or provide a warning when the controller determines the change in position is significant. The connecting rod or valve component sensor can be calibrated during retrofitting. To calibrate each sensor during retrofitting, the sensor being calibrated is moved to touch the connecting rod or valve component and then backed out known distances to create a calibration profile for the anisotropic magneto-resistive sensor 154.

The control system included in the controller 112 of the gas compressor 102 requires simultaneous sampling of multiple sensors or knowing the time that a measurement was taken. As these measurements are taken at different electronic sense modules, time is synchronized between the electronic sense modules. Many controls in the gas compressor 102 require a communication latency in the sub-microsecond range, so time is synchronized among the electronic sense modules to less than about one microsecond.

FIG. 7 shows a flow diagram of a method 700 in a gas compressor for synchronizing information collection and transmitting control information to subsystems of the gas compressor in accordance with some embodiments of the present disclosure. The method 700 includes, in a gas compressor, synchronizing, to within less than about one microsecond, collection of a valve field angle from an anisotropic magneto-resistive sensor from a first electronic engine control module with collection of a compressor position from a compressor position module (block 702), converting the valve field angle to a valve linear position (block 704), processing the compressor position and the valve linear position to generate a control signal for the gas compressor (block 706), and transmitting the control signal to a subsystem of the gas compressor requiring the control signal (block 708).

FIG. 2 shows a flow diagram of a method 200 for determining the linear position of a valve in a gas compressor in accordance with some embodiments of the present disclosure. The method 200 includes receiving a first valve signal from a first valve sensor located on a first cylinder included in a gas compressor, the first cylinder including a first valve having a first valve piston located at a first valve linear piston position, the first valve signal providing first valve field angle information (block 202), processing the first valve signal to determine the first valve linear piston position (block 204), receiving a second valve signal from a second valve sensor located on a second cylinder included in the gas compressor, the second cylinder including a second valve having a second valve piston located at a second valve linear piston position, the second valve signal providing second valve field angle information (block 206), and processing the second valve signal to determine the second valve piston linear position (block 208).

In some embodiments, the method 200 further includes receiving a first compressor signal from a first compressor sensor located on the first cylinder, the first cylinder including a first compressor piston located at a first compressor linear piston position and the first compressor signal providing first compressor angle information; processing the first compressor signal to determine the first compressor piston linear position; receiving a second compressor signal from a second compressor sensor located on the second cylinder, the second cylinder including a second compressor piston located at a second compressor piston linear position, the second compressor signal providing second compressor angle information; processing the second compressor signal to determine the second compressor piston linear position; and receiving the first valve signal, the second valve signal, the first compressor signal, and the second compressor signal in a time window of less than about one microsecond.

In some embodiments, receiving the first valve signal from the first valve sensor located on the first cylinder includes receiving the first valve signal from an anisotropic magneto-resistive sensor having an anisotropic magneto-resistive sensor location on the cylinder, the first valve piston coupled to a shaft and a magnet located at a magnet location on the shaft, the angle information relating the anisotropic magneto-resistive sensor location to the magnet location.

In some embodiments, processing the first valve signal to determine the first valve linear piston position includes accessing a lookup table to match the first valve field angle information to the first valve piston linear position.

Information from both terminals of each anisotropic magneto-resistive sensor is processed to compute the ARCTAN (angle) detected by the sensor. In some embodiments, ARCTAN is be determined using a lookup table approximation. A computational model in the form of a lookup table can be used to convert the ARCTAN to a linear position for a piston. The lookup table can be determined either experimentally or through simulation. The lookup table ends can be re-calibrated in the field.

In some embodiments, the method 200 further includes calibrating a magnetic circuit in the gas compressor with a connecting rod or valve component when replacing the connecting rod or valve component in the gas compressor and detecting a change in position of the connecting rod or valve component over time by identifying a change in a magnetic field of the magnetic circuit.

Non-linear processing is used to convert the sensor angle (angle between the sensor and a magnet) to a linear position and corrects for current. To generate a substantially exact position for the information provided by a plurality of sensors is combined. In operation, a linear position is calculated between about ten times per second and a million times per second and sent to other devices in the gas compressor 102 (shown in FIG. 1), such as a spark and fuel control system, combustion analysis system, or motor commutation system.

Figure 3:
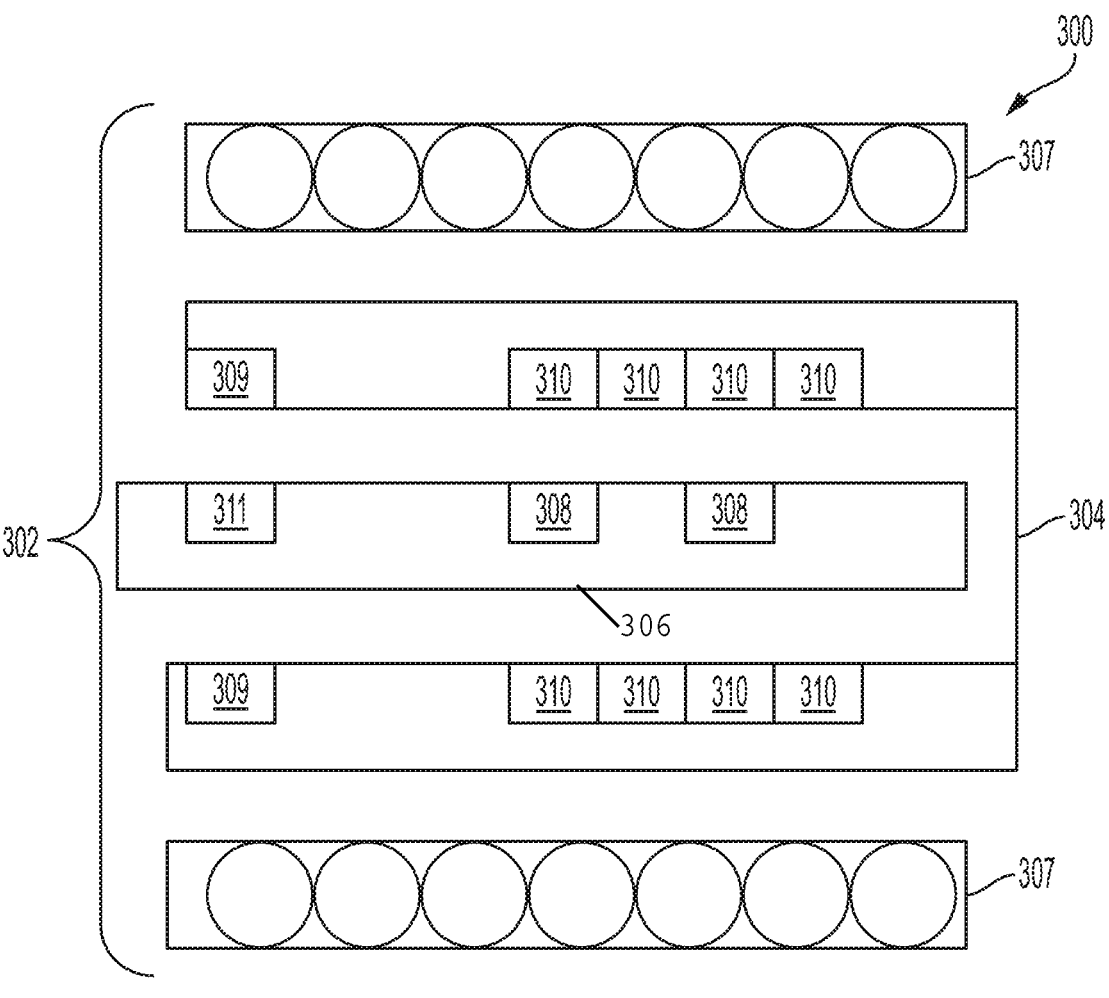
FIG. 3 shows an illustration of an apparatus including a free piston engine in accordance with some embodiments of the present disclosure.

FIG. 3 shows an illustration of an apparatus 300 including a cross-section view of a portion of a free piston engine 302 in accordance with some embodiments of the present disclosure. The free piston engine 302 shown in FIG. 3 illustrates a single piston of a free piston engine. Those skilled in the art will appreciate that the teachings of the present disclosure also apply to a piston engine having more than one piston. The free piston engine 302 can be incorporated into a variety of machines, such as pumps and compressors.

The free piston engine 302 includes a piston 304, a piston rail 306, a plurality of coils 307, a plurality of anisotropic magneto-resistive sensors 308, and a plurality of magnets 310. In some embodiments, the free piston engine 302 includes a small ring magnet 309 included in the piston 304 and a plurality of anisotropic magneto-resistive sensors 311 included in the piston rail 306 to sense the position of the small ring magnet 309.

The piston 304, in some embodiments, such as the embodiment shown in FIG. 3, is hollow. For a hollow piston, the piston rail 306 is aligned substantially parallel to the piston 304 and positioned within the empty space of the piston 304. The plurality of magnets 310, in some embodiments, are included in the piston 304. The plurality of anisotropic magneto-resistive sensors 308, in some embodiments, are included in the piston rail 306. In some embodiments, the plurality of anisotropic magneto-resistive sensors 308 are mounted on the piston rail 306. In some embodiments, the plurality of anisotropic magneto-resistive sensors 308 are located with the plurality of coils 307. In this embodiment, the anisotropic magneto-resistive sensors 308 and the anisotropic magneto-resistive sensors 311 are mounted in the "coil roots" between the coils in the plurality of coils 307 and the sensor field angle is compensated for the current in the field windings. "Coil roots" are the spaces between the plurality of coils 307.

In operation of the free piston engine 302, the piston 304 travels along the path of the piston rail 306. As the piston 304 moves along the path of the piston rail 306, the plurality of magnets 310 are sensed by the anisotropic magneto-resistive sensors 308. The angles of each of the plurality of magnets 310 is measured at the anisotropic magneto-resistive sensors 308. Information generated by the anisotropic magneto-resistive sensors 308 is provided to a free piston electronic sense module 404 (shown in FIG. 4). The free piston electronic sense module 404 is coupled to a free piston engine controller 402 (shown in FIG. 4). The combination of the plurality of anisotropic magneto-resistive sensors 311 and the small ring magnet 309 enable the accurate measurement of top dead center piston position.

In operation, the anisotropic magneto-resistive sensors 311 provide information identifying a precise position of the piston 304 at the end of a stroke. If a precise location of the piston is required at both ends of the stroke, a ring magnet can be included at both ends of the piston 304, and an anisotropic magneto-resistive sensor can be included at appropriate locations in the piston rail 306.

Figure 4:
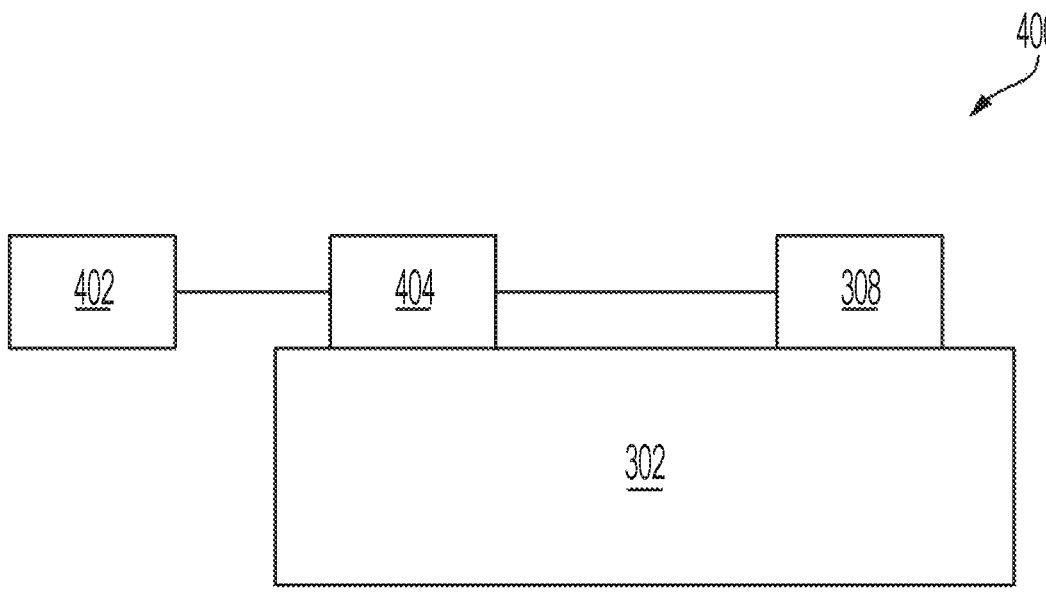
FIG. 4 shows a block diagram of an apparatus including a free piston engine, a controller, and a sense module in accordance with some embodiments of the present disclosure.

FIG. 4 shows a block diagram of an apparatus 400 including a free piston engine 302, a free piston engine controller 402, a free piston engine electronic sense module 404, and a plurality of magneto resistive sensors 308 in accordance with some embodiments of the present disclosure. The free piston engine controller 402 is coupled to the free piston engine electronic sense module 404. Each of the plurality of magneto-resistive sensors 308 is coupled to the free piston engine electronic sense module 404. In operation, the free piston engine controller 402 communicates with the free piston engine electronic sense module 404. The free piston engine controller transmits control information to the free piston engine electronic sense module 404 and receives information from the magneto-resistive sensors 308 coupled to the free piston engine electronic sense module 404.

Figure 5:
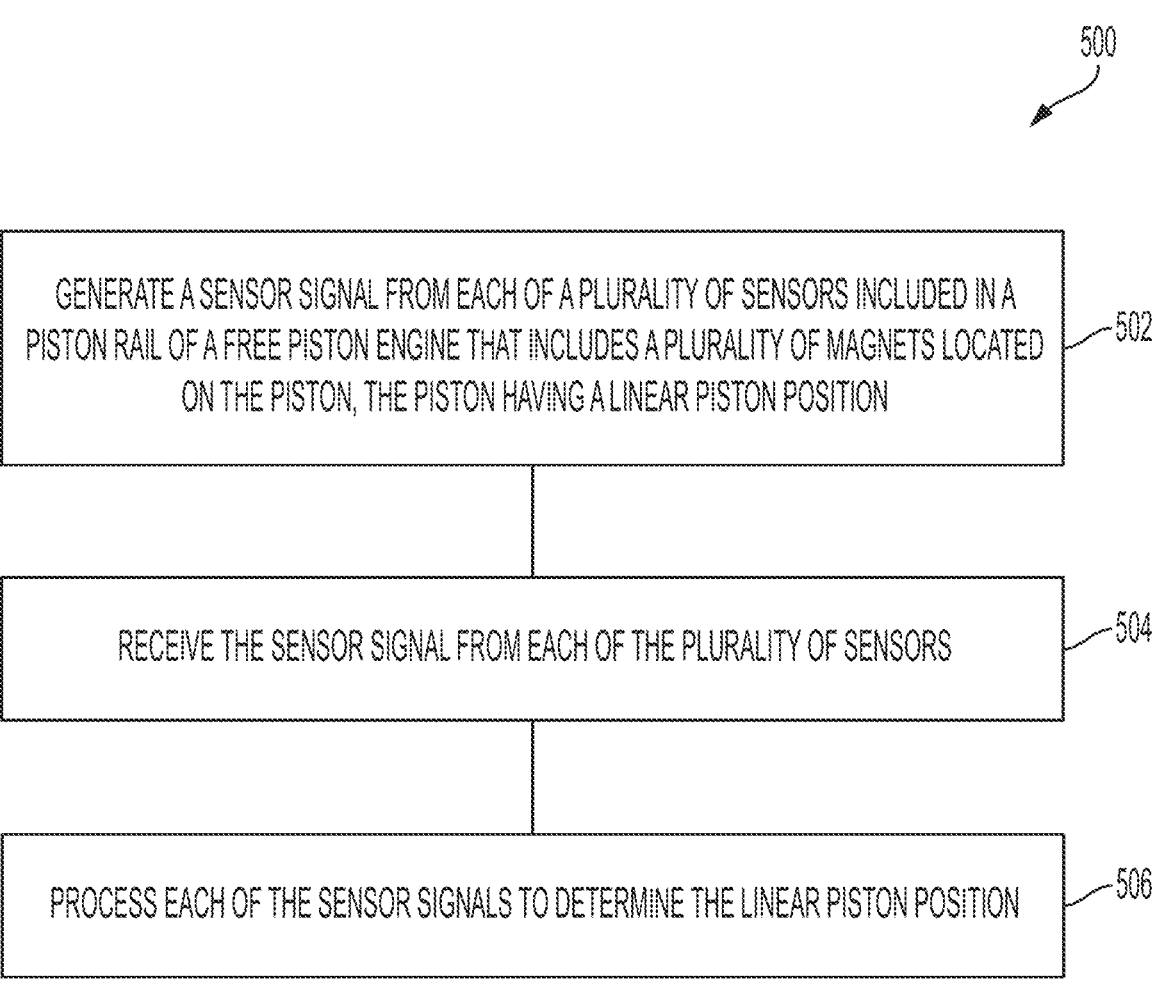
FIG. 5 shows a flow diagram of a method for determining the linear position of a piston in a free piston engine in accordance with some embodiments of the present disclosure.

FIG. 5 shows a flow diagram of a method 500 for determining the linear position of a piston 304 (shown in FIG. 3) in a free piston engine 302 (shown in FIG. 3) in accordance with some embodiments of the present disclosure. The method 500 includes generating a sensor signal from each of a plurality of sensors included in a piston rail of a free piston engine that includes a plurality of magnets located on the piston, the piston having a linear piston position (block 502), receiving the sensor signal from each of the plurality of sensors (block 504), and processing each of the sensor signals to determine the linear piston position (block 506). In some embodiments, the method further includes rotating the piston during operation of the free piston engine 310.

FIG. 6 shows a flow diagram of a method for determining the top dead center position of a piston in a free piston engine in accordance with some embodiments of the present disclosure. The method 600 includes determining, for a piston having a piston velocity of about twenty meters per second at mid-stroke in a free piston engine, a top dead center piston linear position to an accuracy of about ten microns (block 602). In some embodiments, wherein determining, for the piston having a piston velocity of about twenty meters per second at mid-stroke in the free piston engine, the top dead center piston linear position to an accuracy of about ten microns includes generating a sensor signal, when the piston position is top dead center, from an anisotropic magneto-resistive sensor included in a piston rail of a free piston engine that includes a magnet located on the piston, and processing the sensor signal to determine the top dead center linear piston position.

Figure 8A:
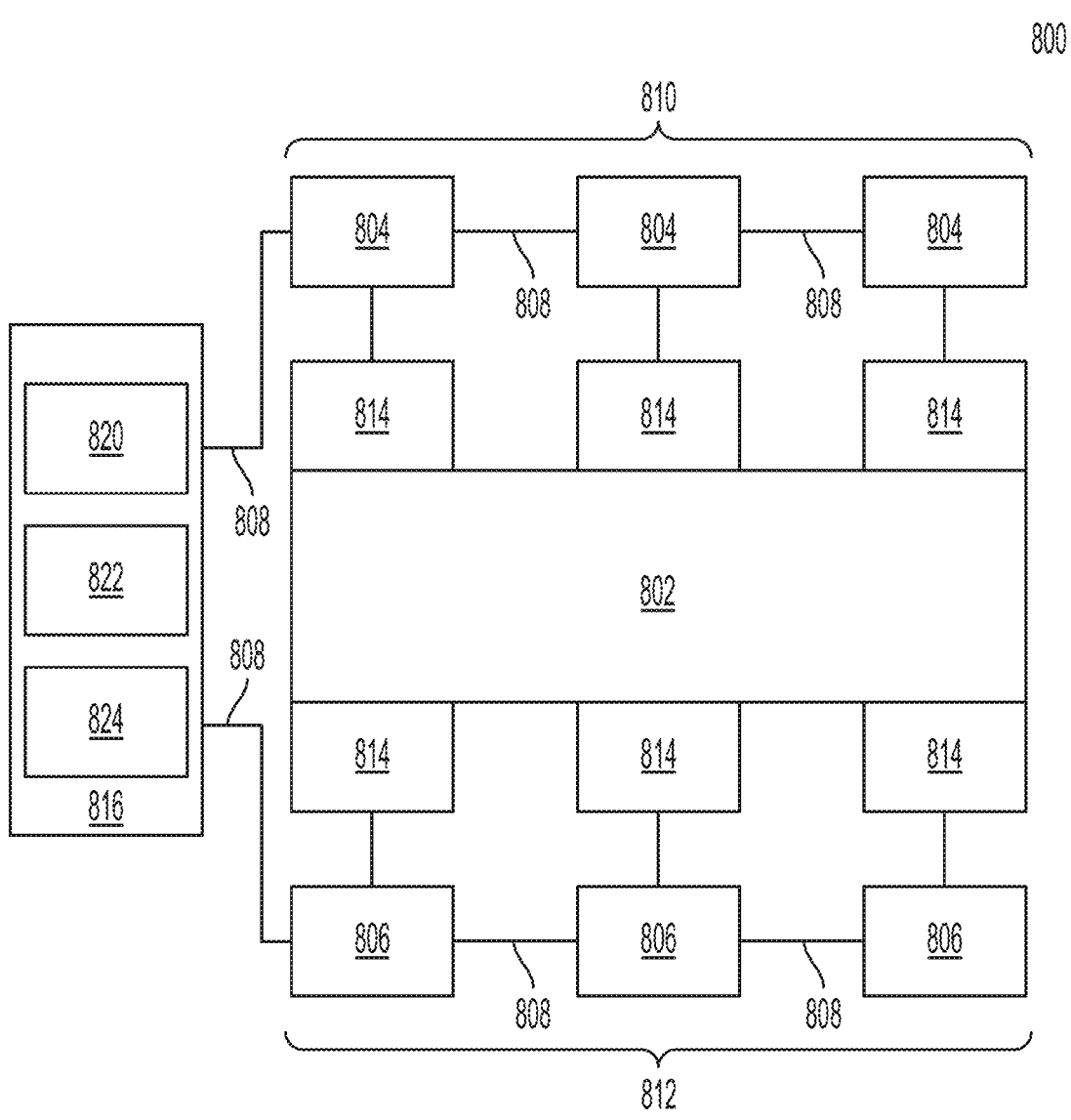
FIG. 8A shows an apparatus for use in controlling a gas compressor or free piston engine in accordance with some embodiments of the present disclosure.

FIG. 8A shows an apparatus 800 for use in controlling a gas compressor or free piston engine 802 in accordance with some embodiments of the present disclosure. The apparatus 800 includes a first plurality of electronic sense modules 804 and a second plurality of electronic sense modules 806. Each of the first plurality of electronic sense modules 804 is daisy chained together through a first cable type 808 to form a first daisy chain 810. The first cable bus 808 includes a fast bus and an Ethernet bus. The first cable bus 808 can include two twisted pair and the fast bus can transmit at about ten bytes per microsecond. A fast bus enables transmitting, receiving, and processing information and messages included in eighty bytes or less in a time window of about one microsecond. This function and performance is critical for precisely controlling a gas compressor or free piston engine. For example, one of the plurality of electronic sense modules 804 receives an instruction to fire a fuel injector, spark plug, plasma ignition system, or trigger a sample of some sensor at three degrees top dead center. Every microsecond the one of the plurality of sense modules 804 receives a valve position. When the valve position is three degrees top dead center, the one of the plurality of sense modules 804 issues a command on the fast bus to ignite. An Ethernet bus is unable to transmit, receive, process and retransmit messages in a gas compressor or free piston engine environment with this precision.

Each of the second plurality of electronic sense modules 806 is daisy chained together through the first cable type 808. The second plurality of electronic sense modules 806 forms a second daisy chain 812. In some embodiments, each of the first plurality of electronic sense modules 804 and each of the second plurality of electronic sense modules 806 is coupled to one of a plurality of sensors 814 in the compressor or the free piston engine 802. Each of the first plurality of electronic sense modules 804 and each of the second plurality of sense modules 806 decodes messages on the fast bus. In addition, each of the first plurality of electronic sense modules 804 and each of the second plurality of sense modules 806 includes the capability to control actuators included in the gas compressor or free piston engine 802.

In some embodiments, the apparatus 800 further includes a controller 816 coupled to the first daisy chain 810 through the first cable type 808 and to the second daisy chain 812 through the first cable type 808. In some embodiments, the controller 816 includes a first fast bus controller 820, a second fast bus controller 822, and a processor 824. The first fast bus controller 820 is coupled to the fast bus of the first daisy chain 810 and the second fast bus controller 822 is coupled to the fast bus of the second daisy chain 812 and the processor 824 is coupled to the Ethernet bus of the first daisy chain 810 and the ethernet bus of the second daisy chain 812.

In some embodiments, the first fast bus controller 820 includes a field-programmable gate array. A field-programmable gate array can process information on the fast message bus faster than the processor 822. In operation, the field-programmable gate array receives and sends messages within a window of about one microsecond. In some embodiments, the first fast bus controller 820 is an application specific integrated circuit.

In some embodiments, each of the electronic sense modules 804 and 806 includes a fast bus controller 820 to receive and transmit information over the fast bus and a processor 824 to receive and transmit information over the Ethernet bus, and a sense amplifier 826 to receive signals from an anisotropic magneto-resistive sensor.

Figure 8B:
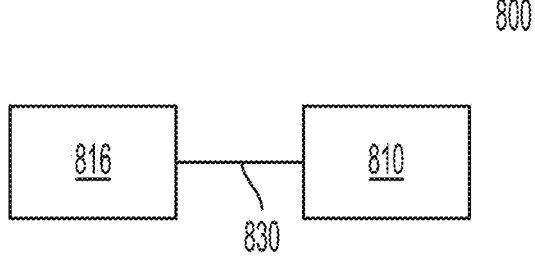
FIG. 8B illustrates another embodiment of the apparatus shown in FIG. 8A in accordance with some embodiments the present disclosure.

FIG. 8B illustrates another embodiment of the apparatus 800 shown in FIG. 8A in accordance with some embodiments of the present disclosure. In particular, the apparatus 800 shown in FIG. 8B shows the controller 816 coupled to the first daisy chain 810 through a second cable type 830 through an Ethernet bus.

Figure 8C:
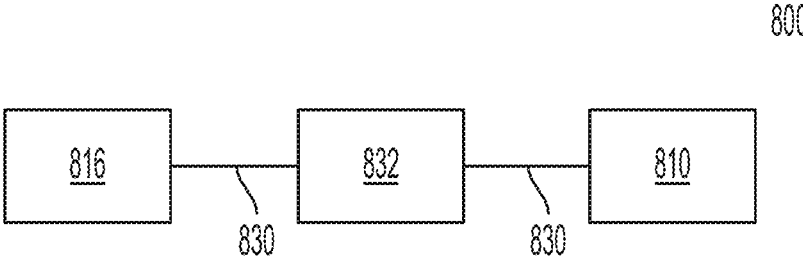
FIG. 8C illustrates another embodiment of the apparatus shown in FIG. 8A in accordance with some embodiments of the present disclosure.

FIG. 8C illustrates another embodiment of the apparatus 800 shown in FIG. 8A in accordance with some embodiments of the present disclosure. In particular, the apparatus 800 shown on FIG. 8C shows the controller 816 coupled to a bridge 832 through the second cable type 830 and the bridge 832 coupled to the first daisy chain 810 through the second cable type 830. The bridge 832 converts from standard Ethernet to Automotive Ethernet. The bridge 832 enables the use of a relatively slow and inexpensive controller 816, but retains a high data rate of the fast bus between the first plurality of electronic sense modules 804 and the second plurality of electronic sense modules 806.

FIG. 9 shows a flow diagram of a method 900 in a gas compressor or free piston engine for generating a control signal in accordance with some embodiments of the present disclosure. The method 900 includes transmitting a target piston position over an Ethernet bus to an electronic sense module included in a gas compressor or a free piston engine (block 902), transmitting a real time piston linear position over a fast bus to the electronic sense module (block 904), comparing the target piston position to the real time piston linear position in the electronic sense module (block 906), and transmitting a control signal to a subsystem included in the compressor or the free piston engine when the real time piston linear position substantially equals the target piston position (908).

In some embodiments, the method 900 further includes transmitting configuration information for a fast bus over the Ethernet bus to each of a plurality of electronic sense modules capable of transmitting and receiving one or more fast bus messages, and calculating a latency for at least one of the one or more fast bus messages. In some embodiments, wherein transmitting the real time linear piston position over the fast bus to the electronic sense module includes transmitting a packet including a dead byte and the real time linear position, and setting a bus connection for the first electronic sense module to a tristate level in response to receiving the dead byte. In some embodiments, the packet including the dead byte provides control information for two pistons in the free piston engine. In some embodiments, transmitting the real time piston linear position over the fast bus to the electronic sense module includes transmitting the real time linear piston position to the electronic sense module at a rate of about once per microsecond.

FIG. 10 shows an illustration of an apparatus 1000 in accordance with some embodiments of the present disclosure. The apparatus 1000 includes a substrate 150 and a moving part 1002 of a piston 1004, a magnet 152 embedded in the substrate 150, and an anisotropic magneto-resistive sensor 154 embedded in the substrate 150. The magnet 152 provides a magnetic field having a field angle at the anisotropic magneto-resistive sensor 154. The substrate 150 is mounted on a device 1006 including the piston 1004. In operation, the moving part 1002 magnetically couples to the magnet 152 at one end of a stroke of the piston 1004. In some embodiments, the device 1006 includes a compressor, a crankshaft engine, or a free piston engine. In some embodiments, the piston has a stroke distance of between about one millimeter and about two millimeters. In some embodiments, the moving part 1002 includes a shaft of the piston 1004. In operation, the anisotropic magneto-resistive sensor 154 senses a field angle that changes as the moving part 1002 recedes from or approaches the anisotropic magneto-resistive sensor 154. A signal from the anisotropic magneto-resistive sensor is processed to determine a linear position of the piston 1004.

Reference throughout this specification to "an embodiment," "some embodiments," or "one embodiment." means that a particular feature, structure, material, or characteristic described in connection with the embodiment is included in at least one embodiment of the present disclosure. Thus, the appearances of the phrases such as "in some embodiments," "in one embodiment," or "in an embodiment," in various places throughout this specification are not necessarily referring to the same embodiment of the present disclosure. Furthermore, the particular features, structures, materials, or characteristics may be combined in any suitable manner in one or more embodiments.

Although explanatory embodiments have been shown and described, it would be appreciated by those skilled in the art that the above embodiments cannot be construed to limit the present disclosure, and changes, alternatives, and modifications can be made in the embodiments without departing from spirit, principles and scope of the disclosure.

What is claimed is:

1. An apparatus comprising:
   a first plurality of electronic sense modules, each of the first plurality of electronic sense modules daisy chained together through a first cable type to form a first daisy chain, the first cable type including a fast bus and an Ethernet bus; and
   a second plurality of electronic sense modules, each of the second plurality of electronic sense modules daisy chained together through the first cable type, the second plurality of electronic sense modules to form a second daisy chain, wherein each of the first plurality of electronic sense modules and each the second plurality of electronic sense modules is coupled to one of a plurality of sensors in a gas compressor or a free piston engine.

2. The apparatus of claim 1, further comprising a controller coupled to the first daisy chain through the first cable type and to the second daisy chain through the first cable type.

3. The apparatus of claim 2, wherein the controller includes a first fast bus controller, a second fast bus controller, and a processor, the first fast bus controller coupled to the fast bus of the first daisy chain and the second fast bus controller coupled to the fast bus of the second daisy chain and the processor is coupled to the ethernet bus of the first daisy chain and the ethernet bus of the second daisy chain.

4. The apparatus of claim 3, wherein the first fast bus controller comprises a field-programmable gate array.

5. The apparatus of claim 1, further comprising a controller coupled to the first daisy chain through a second cable type including an Ethernet bus.

6. The apparatus of claim 1, further comprising a controller coupled to a bridge through a second cable type and the bridge coupled to the first daisy chain through the second cable type.

7. The apparatus of claim 1, wherein the plurality of sensors are disposed in a gas compressor.

8. The apparatus of claim 7, wherein each of the plurality of sensors is a valve sensor.

9. The apparatus of claim 8, wherein the valve sensor comprises an anisotropic magneto-resistive sensor.

10. The apparatus of claim 9, wherein the first plurality of electronic sense modules includes a first particular number of electronic sense modules and power is managed by controlling the first particular number of electronic sense modules.

11. The apparatus of claim 10, wherein the second plurality of electronic sense modules includes a second particular number of electronic sense modules, each of the second plurality of electronic sense modules has a sampling rate and power is managed by decreasing the sampling rate.

12. The apparatus of claim 1, wherein the plurality of sensors are disposed in a free piston engine.

* * * * *